(12) United States Patent  
Yen

(10) Patent No.: US 9,509,816 B2  
(45) Date of Patent: Nov. 29, 2016

(54) MOBILE PHONE ADAPTING DEVICE AND SYSTEM

(71) Applicant: Chieh-Hung Yen, New Taipei (TW)

(72) Inventor: Chieh-Hung Yen, New Taipei (TW)

( * ) Notice: Subject to any disclaimer, the term of this patent is extended or adjusted under 35 U.S.C. 154(b) by 0 days.

(21) Appl. No.: 15/089,106

(22) Filed: Apr. 1, 2016

(65) Prior Publication Data

US 2016/0294996 A1    Oct. 6, 2016

(30) Foreign Application Priority Data

Apr. 1, 2015   (TW) .................................. 104110725  
Jan. 27, 2016  (TW) .................................. 105201265

(51) Int. Cl.
```
H04M 1/00      (2006.01)
H04M 1/04      (2006.01)
G02B 7/02      (2006.01)
```
(52) U.S. Cl.  
CPC .............. *H04M 1/04* (2013.01); *G02B 7/023* (2013.01); *G02B 7/026* (2013.01)

(58) Field of Classification Search  
CPC .................................................... H04M 1/00  
See application file for complete search history.

(56) References Cited

U.S. PATENT DOCUMENTS

2008/0146297 A1* 6/2008 Ho ...................... H04M 1/0237  
455/575.4

* cited by examiner

*Primary Examiner* — Bobbak Safaipour  
(74) *Attorney, Agent, or Firm* — WPAT, P.C., Intellectual Property Attorneys; Anthony King

(57) ABSTRACT

A mobile phone adapting device for an external lens is provided, which includes a first body, second body, a lens adapting ring and a connecting member. The first body fixes a mobile phone to the mobile phone adapting device, and the mobile phone has a mobile phone lens. The second body includes a plate movable in a direction parallel to a first axis or a second axis. The lens adapting ring fixes an external lens to the mobile phone adapting device. The connecting member connects the second body and the lens adapting ring. The connecting member moves along a third axis for adjusting the distance between the external lens and the mobile phone lens. The mobile phone adapting device further includes a hood disposed between the lens adapting ring and the mobile phone to prevent ambient leak light from interfering with optical images inside the lens adapting ring.

20 Claims, 19 Drawing Sheets

1A

MOBILE PHONE ADAPTING DEVICE AND SYSTEM

RELATED APPLICATIONS

This application claims the benefit of Taiwanese Patent Application No. 104110725, filed on Apr. 1, 2015 and Taiwanese Patent Application No. 105201265, filed on Jan. 27, 2016, the entire content of which is incorporated herein by reference.

FIELD OF THE INVENTION

The present invention relates to a mobile phone adapting device, in particularly, to a mobile phone adapting device for connecting a mobile phone with a non-specific brand name and a lens with non-specific dimensions.

BACKGROUND OF THE INVENTION

In a conventional optical microscopic experiment, a user observes macro images of a specimen with an optical microscope. To capture the macro images, the user adds an image capturing system to the optical microscope to facilitate subsequent research, as the image capturing system is equipped with a light sensor. Commercially available image capturing systems are expensive. To connect an image capturing system and an optical microscope, the user needs to purchase a customized adapter. As a result, only professional laboratories with sufficient budgets can afford to purchase an image capturing system.

In recent years, camera lens modules of smartphones come with an increasingly large number of pixels and thus can take pictures to the satisfaction of most users in terms of the demand for ease of use. Due to the lightweight and portability of smartphones, it is feasible for a user to connect a smartphone to an optical microscope during an experiment, so as to display macro images observed with the eyepiece on the mobile phone screen and send the macro images to a storage apparatus through mobile communication and transmission, thereby enhancing the efficiency of the experiment, meeting the demand for observing images by multiple persons simultaneously, and particularly serving a teaching purpose.

To make good use of the increasingly robust smartphone functions, such as camera lens modules, high-resolution screens, and mobile communication and transmission, now a mobile phone adapter is commercially available, however such adapter can be only for a mobile phone with a specific brand name and model number to connect the mobile phone and the eyepieces of a specific optical device such that the mobile phone can take pictures or shoot videos of images captured with the optical device. The aforesaid mobile phone adapters are customized and thus expensive. Furthermore, the mobile phone adapters are inapplicable to mobile phones or optical device lens with different brand names and model numbers.

SUMMARY OF THE INVENTION

To resolve the problems of how to connect a smartphone to an optical device and that conventional mobile phone adapters cannot be applied to mobile phones or lens with different brand names and model numbers, the present invention provides a mobile phone adapting device for connecting an external lens with non-specific dimensions to a mobile phone with a non-specific brand name such that consumers can connect the external lens to a mobile phone as needed, conveniently and economical, to take digital pictures or shoot digital videos. For example, to perform microscopic observation with an optical microscope during an experiment, a user can mount a mobile phone on the eyepiece of the optical microscope with the mobile phone adapting device of the present invention to thereby effectuate a simple microscope capable of capturing images. The user can capture images of the observed specimen and also can send the captured images to the other users in time, therefore enhancing the convenience and efficiency. In addition, when the mobile phone adapting device of the present invention is positioned between a telescope and a mobile phone, the mobile phone is turned into a simple telescope capable of capturing images to thereby effectuate long-distance observation and record of images.

In one aspect, the present invention provides a mobile phone adapting device including:

a first body including a first rail, a first fixing base disposed at a first end of the first rail, a second fixing base disposed at a second end of the first rail, a second rail extending from the second end to a third end, and a first sliding block movable along the second rail and between the second end and the third end, wherein the first rail connects the first fixing base and the second fixing base, respectively; the first fixing base coupled to the first rail and movable along a first axis; the second rail connecting the second fixing base and the first sliding block; and the first sliding block coupled to the second rail and movable along a second axis;

a second body disposed on an extended plane parallel to the first body, fixed to the first body, and including a third rail; a third fixing base disposed on the extended plane and at a third end of the third rail; a fourth fixing base disposed at a fourth end of the third rail; and a plate disposed on the extended plane, wherein two ends of the third rail are connected to the third fixing base and the fourth fixing base, respectively, with the plate coupled to the third rail and moving along a direction parallel to the first axis;

a lens adapting ring disposed at an upper end of the plate, fixed to the plate, and including a C-shaped structure and a clamping member disposed at a terminal end of the C-shaped structure, wherein the C-shaped structure has a first side and a second side; and a connecting member disposed on the plate and including a fourth rail extending in a direction perpendicular to the plate, a second sliding block surrounding the fourth rail, and a sliding-block casing surrounding the fourth rail, with the second sliding block coupled to the fourth rail and moving along a third axis, wherein the lens adapting ring is connected to the second sliding block.

In a specific embodiment of the present invention, the mobile phone adapting device further includes a hood pivotally connected to the block casing.

In another specific embodiment of the present invention, the lens adapting ring is configured to move in a direction parallel to the third axis and thereby enter the hood.

In yet another specific embodiment of the present invention, the clamping member includes a nut and a screw meshing with the nut.

In an embodiment of the present invention, the lens adapting ring has a vane structure surrounding the second side.

In another embodiment of the present invention, the vane structure is panel-like, wedge-like, triangular, twisted curved or serrate.

In another embodiment of the present invention, the mobile phone adapting device further includes a pivotal connection element disposed at the third end, wherein the third fixing base is pivotally connected to the first sliding block through the pivotal connection element and configured to rotate relative to the first sliding block through a pivot of the pivotal connection element.

In yet another embodiment of the present invention, the first rail contains a spring with two ends connected to the first fixing base and the second fixing base, respectively.

In a preferred embodiment of the present invention, the first axis is perpendicular to the second axis.

In another preferred embodiment of the present invention, the third axis is perpendicular to the first axis and the second axis.

The present invention further provides a mobile phone adapting device including: a first body including a first base including a first abutting part and a slidably-coupling part, a fixing mechanism including a first fixing base and a second fixing base, wherein each of the first fixing base and the second fixing base has a protruding strip slidably-coupled to the slidably-coupling part along a direction parallel to a first axis, and the first fixing base is also slidably-coupled to the second fixing base along the direction parallel to the first axis; a second body located on an extended plane parallel to the first body, including a second base located on the extended plane and including at least a groove, wherein the first base of the first body includes a sliding block corresponding to the groove for embedding into the groove, and the sliding block slides along a direction parallel to a second axis; a lens adapting ring disposed on an upper side of the second base of the second body, the lens adapting ring includes a C-shaped structure and a clamping member disposed at a terminal end of the C-shaped structure, wherein the C-shaped structure has a first side and a second side; and a connecting member disposed on the plate and including a fourth rail extending in a direction perpendicular to the plate, a second sliding block surrounding the fourth rail, and a sliding-block casing surrounding the fourth rail, with the second sliding block coupled to the fourth rail and moving along a third axis, wherein the lens adapting ring is connected to the second sliding block.

The present invention further provides a mobile phone adapting system including the mobile phone adapting device in accordance with the present invention, an external lens fixed to the C-shaped structure and a mobile phone, wherein the external lens can enter the lens adapting ring from the first side, and the clamping member can clamp the C-shaped structure to allow the lens adapting ring to clamp the external lens, wherein the first fixing base and the second fixing base are configured to fix the mobile phone to the first body, wherein the plate or the second base is movable to allow an optical axis of the external lens to coincide with an optical axis of the mobile phone lens, wherein the second sliding block is movable to display optical images of the external lens clearly on the mobile phone screen by adjusting focal length.

Needless to say, persons skilled in the art can make reference to the aforesaid description to thereby make good use of the present invention to the largest extent. Hence, it is understandable that the description below is illustrative rather than restrictive of the disclosure of the present invention.

DETAILED DESCRIPTION OF THE EMBODIMENTS

Figure 1A:
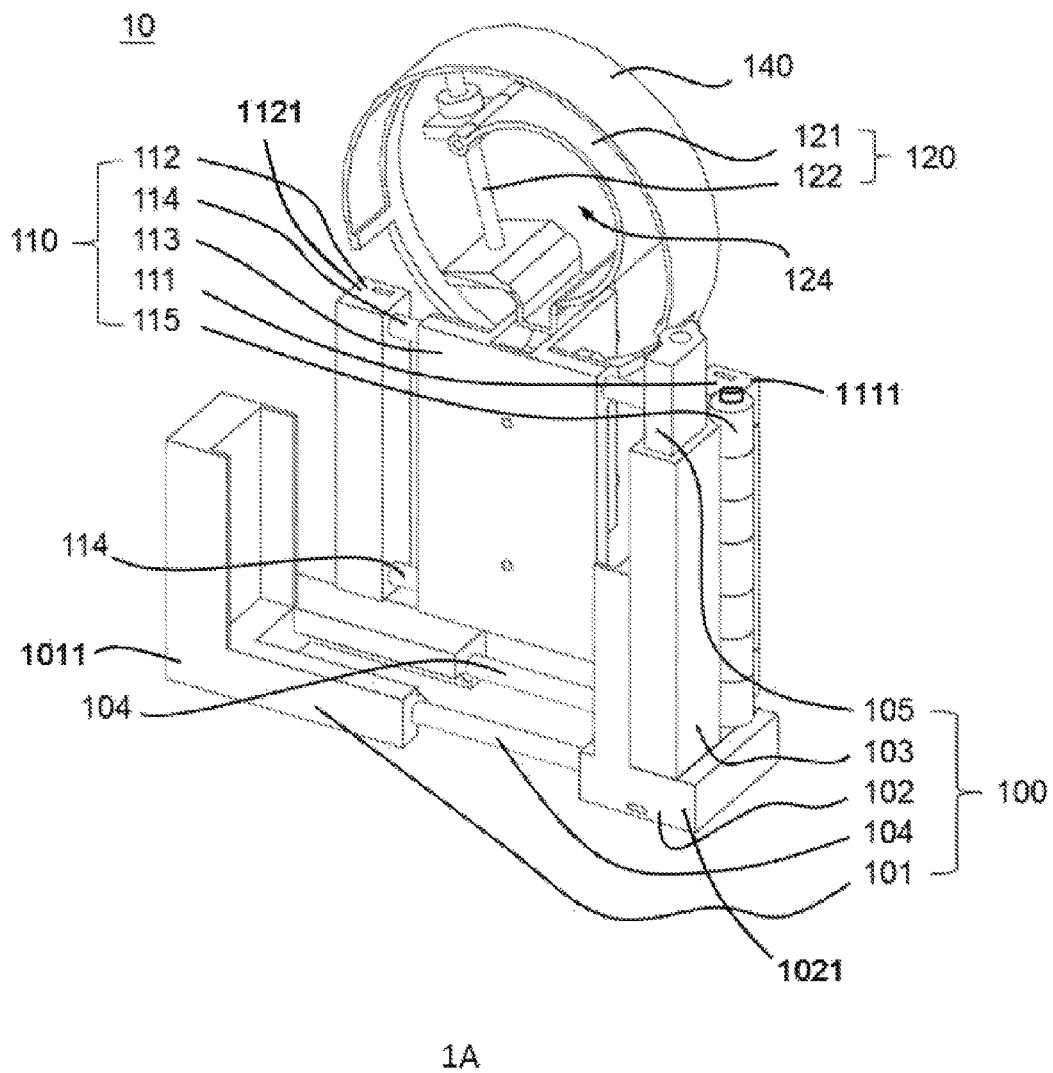
FIG. 1A is a perspective schematic view of a mobile phone adapting device according to a specific embodiment of the present invention.

Unless otherwise defined herein, technical and scientific terms used herein shall have the meanings generally assigned to such terms and understood by persons skilled in the art.

Unless otherwise specified herein, the indefinite articles "a" and "an" used herein shall mean "at least one" (i.e., one or more). For example, when used herein, "a specimen"

shall include a plurality of specimens and the equivalent known among persons skilled in the art.

In another aspect, the present invention provides a mobile phone adapting device 10 for connecting a mobile phone and including a lens-equipped optical system. The mobile phone adapting device 10 is applied to an optical device including images observed with a microscope or a telescope. The mobile phone adapting device 10 includes a first body 100, a second body 110, a lens adapting ring 120, and a connecting member 130.

The first body 100 includes a first rail 104, a first fixing base 101 disposed at a first end 1011 of the first rail 104, a second fixing base 102 disposed at a second end 1021 of the first rail 104, a second rail 105 extending from the second end 1021 to a third end 1111, and a first sliding block 103 moving along the second rail 105 and between the second end 1021 and the third end 1111. The first rail 104 connects the first fixing base 101 and the second fixing base 102, respectively. The first fixing base 101 is coupled to the first rail 104 and moves along a direction parallel to the first axis 106. The second rail 105 connects the second fixing base 102 and the first sliding block 103. The first sliding block 103 is coupled to the second rail 105 and moves along a direction parallel to the second axis 107.

The second body 110 is disposed on an extended plane parallel to the first body 100 and is fixed to the first body 100. The second body 110 includes a third rail 114, a third fixing base 111 disposed on the extended plane and at a third end 1111 of the third rail 114, a fourth fixing base 112 disposed at a fourth end 1121 of the third rail 114, and a plate 113 disposed on the extended plane. The two ends of the third rail 114 are connected to the third fixing base 111 and the fourth fixing base 112, respectively. The plate 113 is coupled to the third rail 114 and can move in a direction parallel to the first axis 106.

The lens adapting ring 120 is disposed at the upper end of the plate 113 and is fixed to the plate 113. The lens adapting ring 120 includes a C-shaped structure 121 and a clamping member 122 disposed at the terminal end of the C-shaped structure 121. The C-shaped structure 121 has a first side 123 and a second side 124.

The connecting member 130 is disposed on the plate 113. The connecting member 130 includes a fourth rail 131 extending in a direction perpendicular to the plate 113, a second sliding block 132 surrounding the fourth rail 131, and a block casing 133 surrounding the fourth rail 131. The second sliding block 132 is coupled to the fourth rail 131 and can move along a direction parallel to the third axis 134. The lens adapting ring 120 is connected to the second sliding block 132.

Figure 1B:
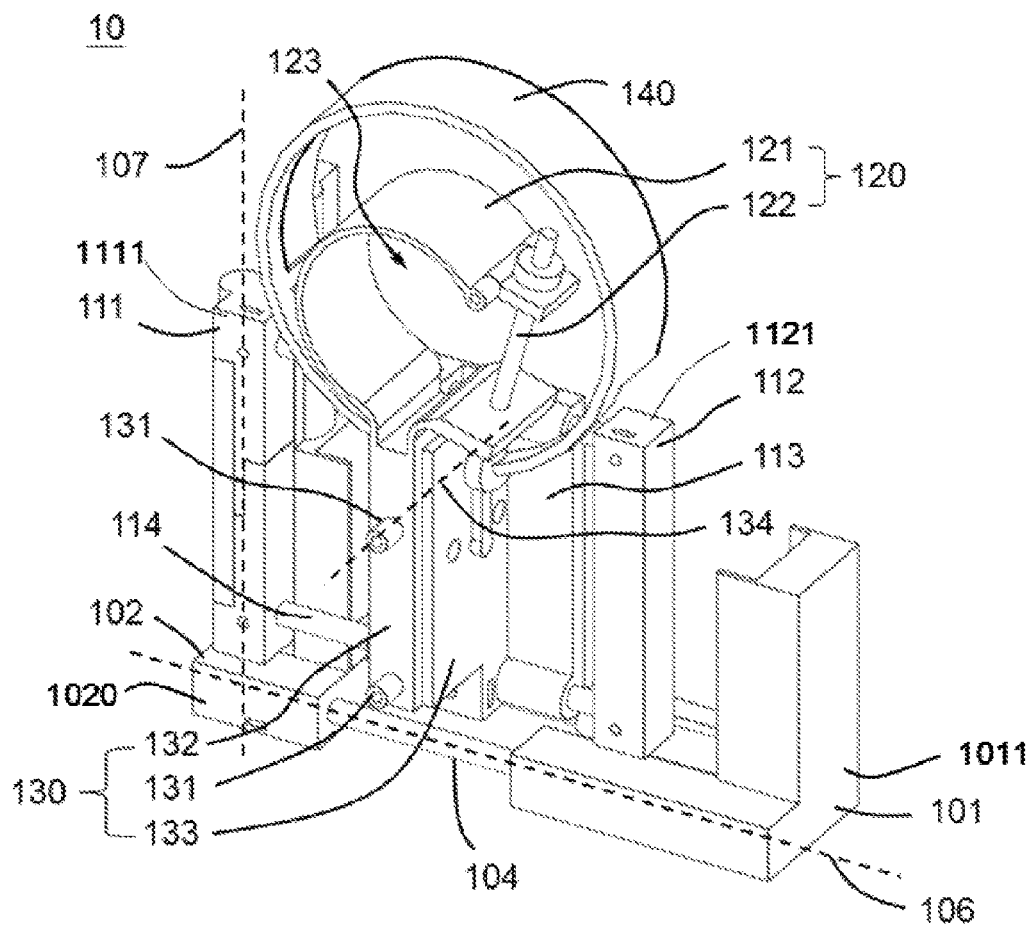
FIG. 1B is a perspective schematic view of the mobile phone adapting device shown in FIG. 1A in another view angle according to a specific embodiment of the present invention.
Figure 1C:
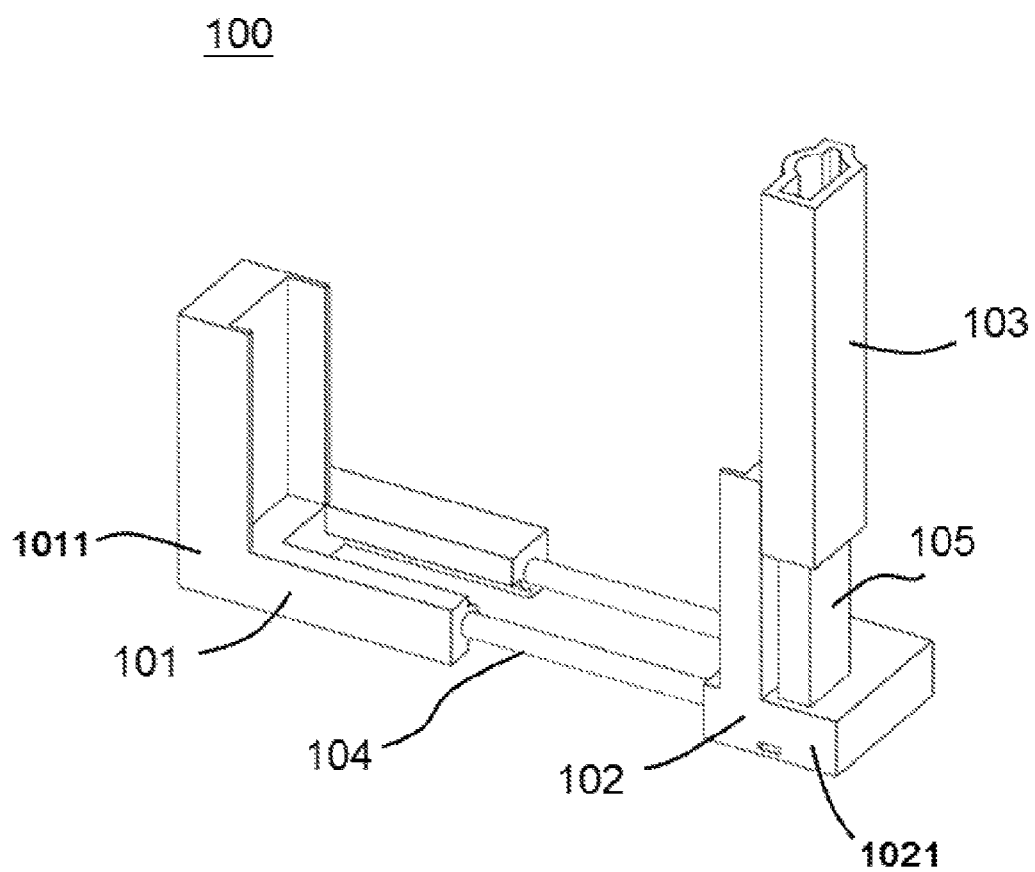
FIG. 1C is a perspective schematic view of a first body of the mobile phone adapting device shown in FIG. 1A according to a specific embodiment of the present invention.
Figure 1D:
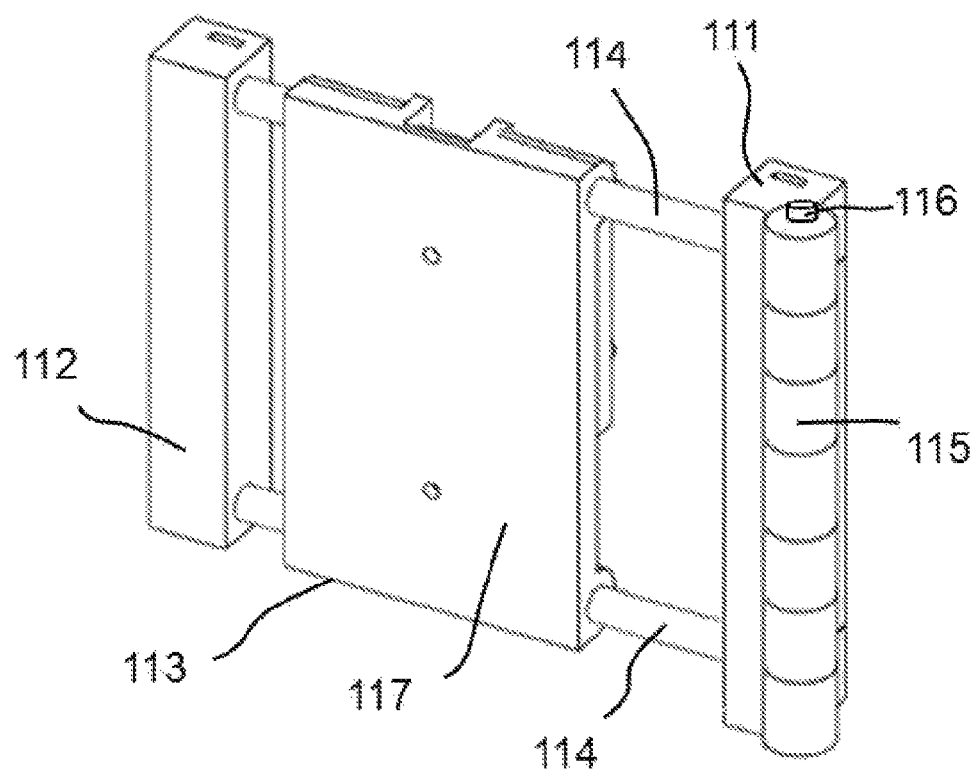
FIG. 1D is a perspective schematic view of a second body of the mobile phone adapting device shown in FIG. 1A according to a specific embodiment of the present invention.
Figure 1E:
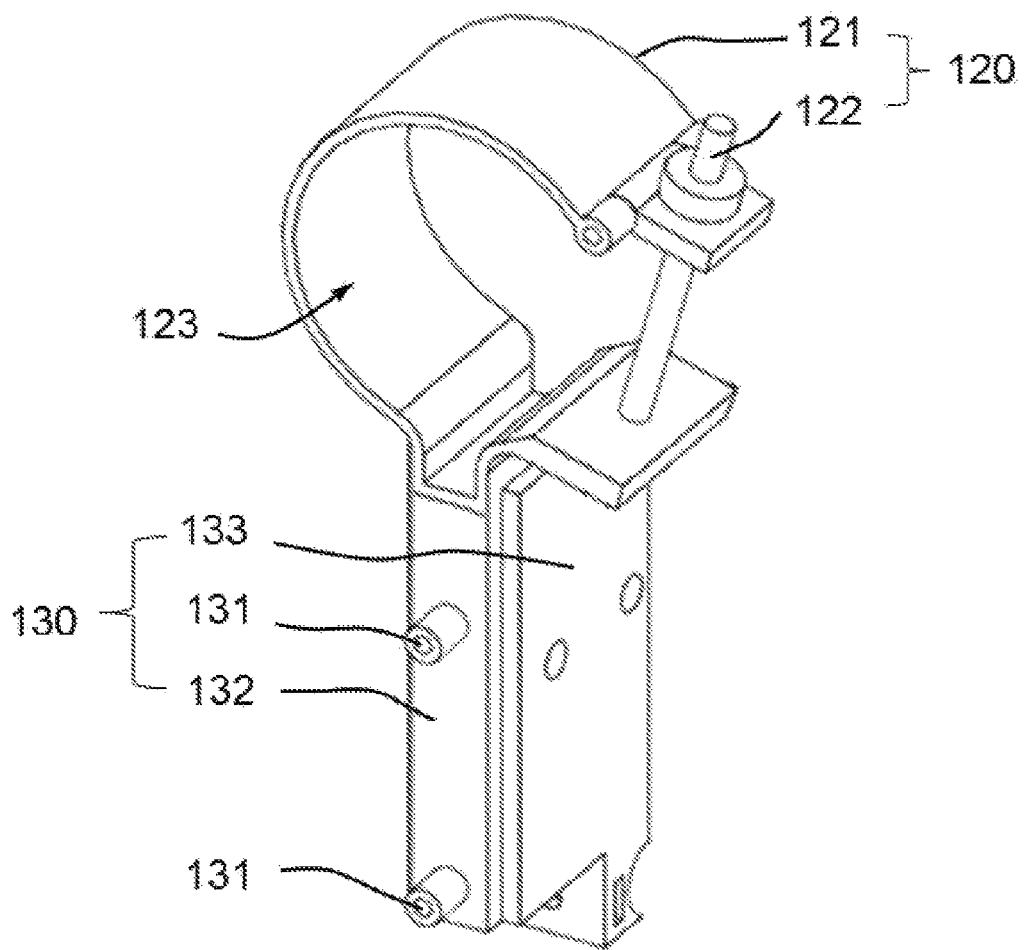
FIG. 1E is a perspective schematic view of a lens adapting ring and a connecting member of the mobile phone adapting device shown in FIG. 1A according to a specific embodiment of the present invention.

FIG. 1A is a perspective schematic view of a mobile phone adapting device according to a specific embodiment of the present invention. FIG. 1B is a perspective schematic view of the mobile phone adapting device shown in FIG. 1A in another view angle according to a specific embodiment of the present invention. FIGS. 1C, 1D, 1E are perspective schematic view of the first body 100, second body 110, lens adapting ring 120 and connecting member 130 of the mobile phone adapting device 10 shown in FIG. 1A according to a specific embodiment of the present invention, respectively. Referring to FIG. 1A through FIG. 1E, an mobile phone adapting device 10 of the present invention is shown. The mobile phone adapting device 10 includes the first body 100, second body 110, lens adapting ring 120, and connecting member 130. The first body 100 includes a first fixing base 101, a second fixing base 102, a first sliding block 103, a first rail 104, and a second rail 105. The first rail 104 connects the first fixing base 101 and the second fixing base 102, respectively. The first fixing base 101 is coupled to the first rail 104 and moves on the first rail 104 along a direction parallel to the first axis 106. The second rail 105 connects the second fixing base 102 and the first sliding block 103, respectively. The first sliding block 103 is coupled to the second rail 105 and the first sliding block 103 and moves on the second rail 105 along a direction parallel to the the second axis 107. The second body 110 includes a third fixing base 111, a fourth fixing base 112, a plate 113, a third rail 114, and a pivotal connection element 115 (optional). The two ends of the third rail 114 are connected to the third fixing base 111 and the fourth fixing base 112, respectively. The plate 113 is coupled to the third rail 114 and moves in a direction parallel to the first axis 106. The third fixing base 111 is pivotally connected to the first sliding block 103 through the pivotal connection element 115. The third fixing base 111 is configured to rotate relative to the first sliding block 103 through a pivot 116 of the pivotal connection element 115. The lens adapting ring 120 includes a C-shaped structure 121 and a clamping member 122 disposed at the terminal end of the C-shaped structure 121. The C-shaped structure 121 has a first side 123 and a second side 124. The connecting member 130 is disposed on the plate 113. The connecting member 130 includes a fourth rail 131, a second sliding block 132, and a block casing 133. The second sliding block 132 is coupled to the fourth rail 131 and moves along a direction parallel to the third axis 134. The lens adapting ring 120 is connected to the second sliding block 132.

Figure 2:
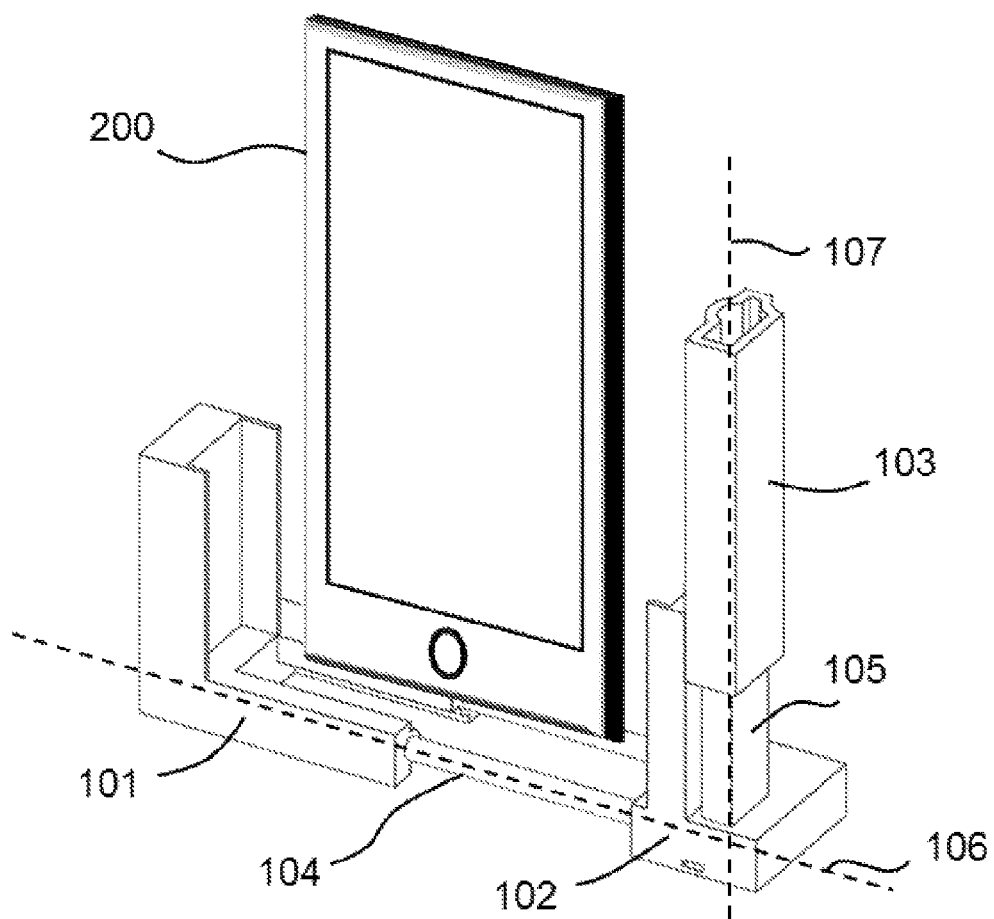
FIG. 2 is a perspective schematic view of a mobile phone fixed to a first fixing base according to a specific embodiment of the present invention.
Figure 3:
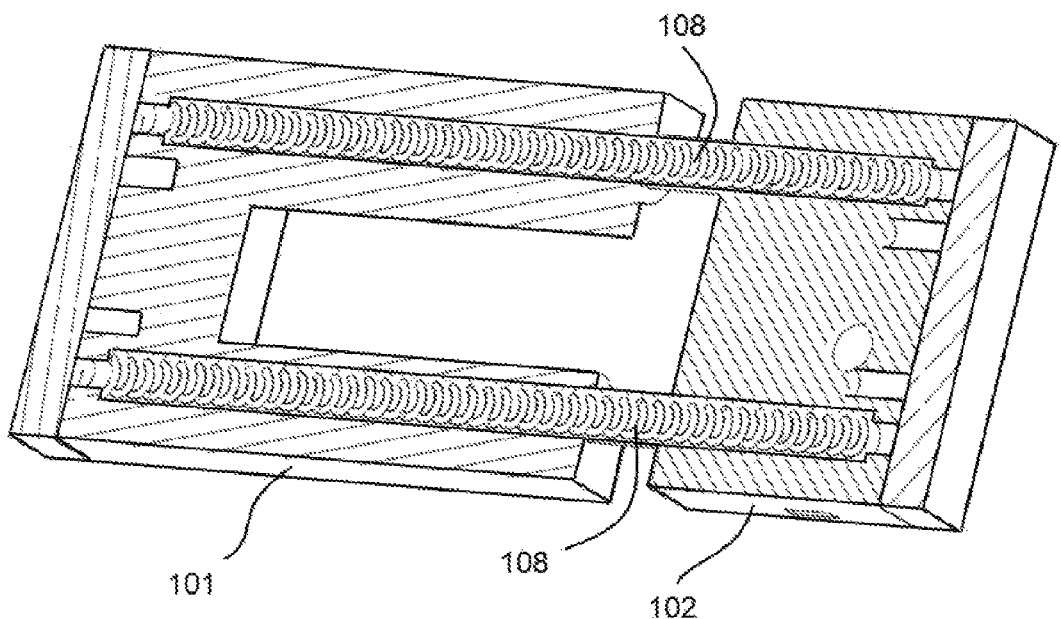
FIG. 3 is a perspective schematic view of a spring with two ends connected to the first fixing base and the second fixing base, respectively, according to another specific embodiment of the present invention.

To fix a mobile phone to the mobile phone adapting device 10, in the present invention, the first fixing base 101 is coupled to the first rail 104, and the first fixing base 101 can move on the first rail 104 along a direction parallel to the first axis 106 (see FIG. 2). In a specific embodiment of the present invention, the first rail 104 contains a spring 108 therein, and the two ends of the spring 108 are connected to the first fixing base 101 and the second fixing base 102, respectively (see FIG. 3). When a mobile phone is not mounted on the mobile phone adapting device 10, the restoring force of the spring 108 brings the first fixing base 101 and the second fixing base 102 into contact with each other. To mount a mobile phone on the first body 100, the user pulls the first fixing base 101 away from the second fixing base 102 along a direction parallel to the first axis 106, and places the mobile phone between the first fixing base 101 and the second fixing base 102, and releases the first fixing base 101, thereby allowing the first fixing base 101 to rebound and fix the mobile phone to the first body 100 under the restoring force of the spring 108. In another specific embodiment of the present invention, the first fixing base 101 can include a fastening element thereon (not shown). When the first fixing base 101 is led to slide to confine the mobile phone between the first fixing base 101 and the second fixing base 102, and then the first fixing base 101 is fastened to the first rail 104 by the fastening element, thereby allowing the mobile phone to be firmly fixed to the first fixing base 101. The way of confining the mobile phone between the first fixing base 101 and the second fixing base 102 is not necessarily achieved by disposing the spring 108 inside the first rail 104; instead, any other clamping structure can be disposed between the first fixing base 101 and the second fixing base 102. In another specific embodiment of the present invention, a hook can be extended from the first fixing base 101, whereas a groove is formed on the lateral surface of the second fixing base 102. The groove of the second fixing base 102 includes a sliding portion for the hook sliding along and a securing portion for fixing the hook. When the hook is fixed to the securing portion, the mobile phone is confined between the first fixing base 101 and the second fixing base 102. In another specific embodiment of the present invention, a screw is inserted along the first axis 106 into the first end 1011 of the first fixing base 101 to mesh with the second fixing base 102. Tightening the screw confines the mobile phone between the first fixing base 101 and the second fixing base 102. In another specific embodiment of the present invention, the head of the screw is coupled to a quick-release handle to enhance ease of use.

To enable the lens adapting ring 120 of the present invention to connect with externally and cover tightly an external lens 210 of different caliber dimensions, the lens adapting ring 120 includes the C-shaped structure 121, including made metal or plastic material, and the clamping member 122 is disposed at the terminal end of the C-shaped structure 121. In a specific embodiment of the present invention, the clamping member 122 includes a nut and a screw meshing with the nut, but the present invention is not limited thereto. In another embodiment of the present invention, the clamping member 122 is snap-engaged with or ratcheted to the C-shaped structure 121. In yet another embodiment of the present invention, the lens adapting ring 120 can further include an optical filter (not shown) therein for filtering out undesirable light. The external lens 210 can include an eyepiece of an optical device such that images observed with the optical device can be focused on a sensing component of the mobile phone through the external lens 210 and the mobile phone lens.

Figure 4:
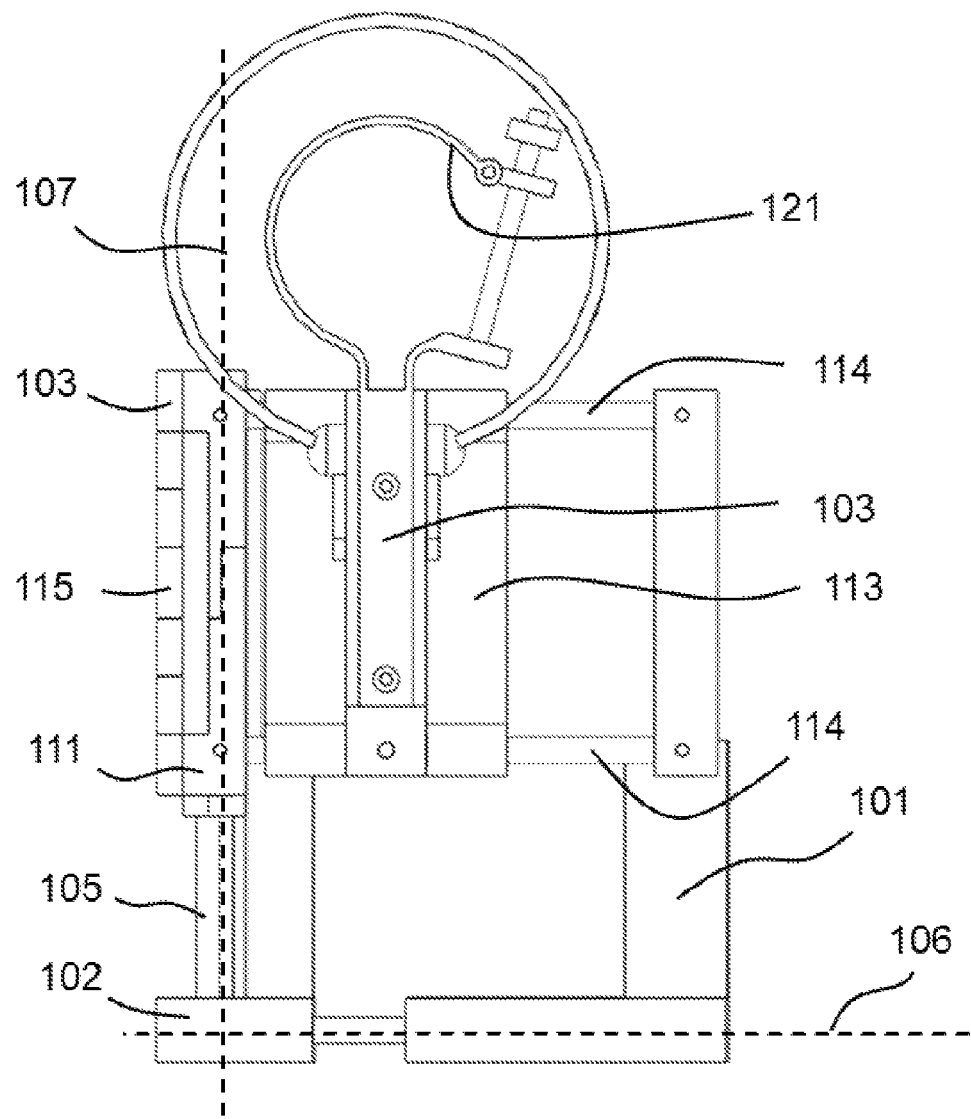
FIG. 4 is a perspective schematic view of a plate movable in a direction parallel to a first axis or a second axis according to a preferred embodiment of the present invention.

The dimensions of a mobile phone depend on the brand name and model number of the mobile phone. The position of a mobile phone lens disposed on the body of the mobile phone is variable. In view of this, the second body 110 is designed into the mobile phone adapting device 10 of the present invention to control the position of the lens adapting ring 120 and thus aligning the optical axis of the external lens 210 precisely with the optical axis of the mobile phone lens. Referring to FIG. 4, regarding the mobile phone adapting device 10 of the present invention, the plate 113 disposed on the second body 110 is coupled to the third rail 114 and moves in a direction parallel to the first axis 106. The third fixing base 111 disposed on the second body 110 is pivotally connected to the first sliding block 103 through the pivotal connection element 115. Hence, the first sliding block 103 enables the second body 110 to move on the second rail 105 along a direction parallel to the second axis 107. Hence, in the mobile phone adapting device 10 of the present invention, the plate 113 can be controlled along the direction parallel to the first axis 106 or the second axis 107. The connecting member 130 is disposed on the plate 113 and the lens adapting ring 120 is disposed on the second sliding block 132 of the connecting member 130, so in the mobile phone adapting device 10 of the present invention, the position of the lens adapting ring 120 can be controlled along a direction along the first axis 106 or the second axis 107.

Figure 5:
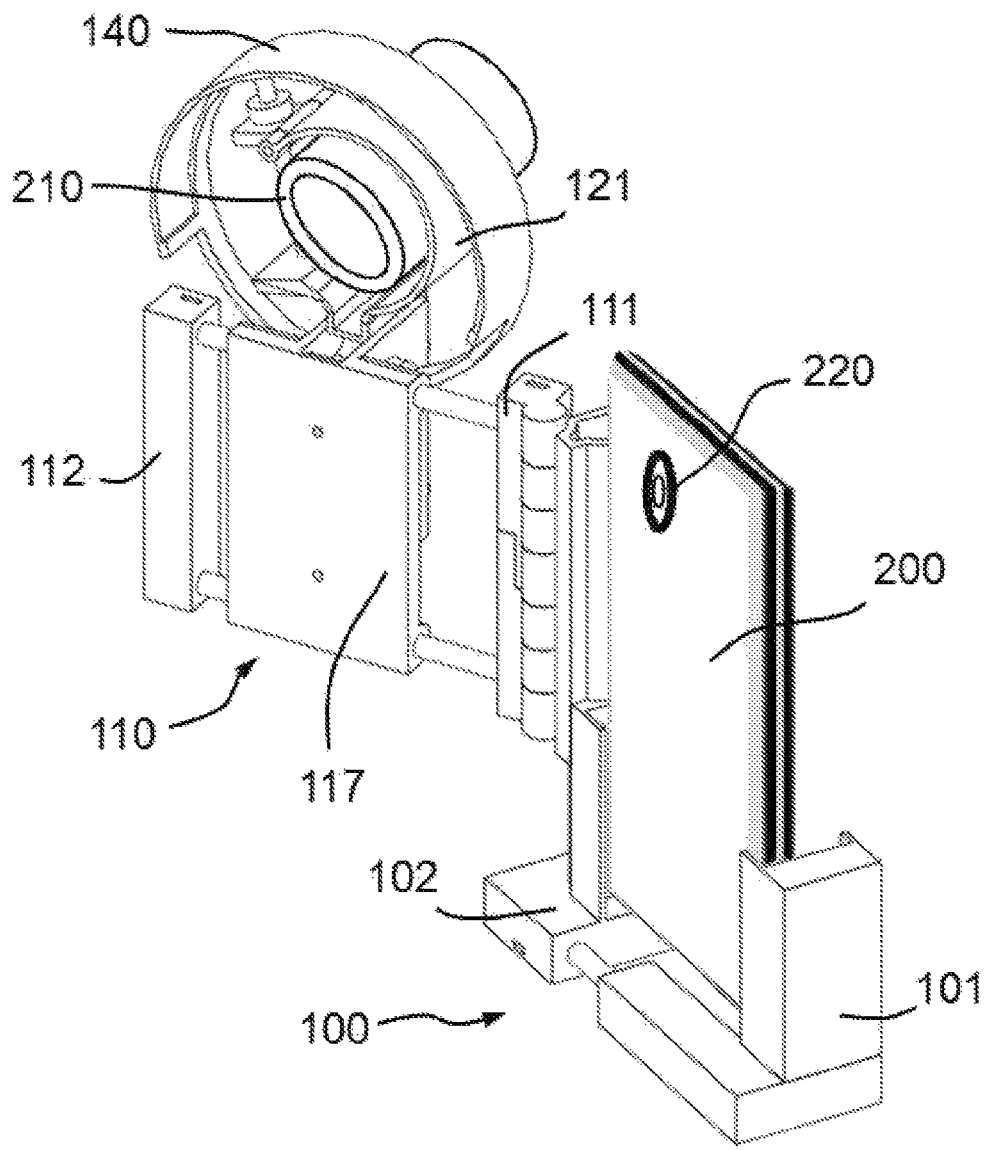
FIG. 5 is a perspective schematic view of the first body away from the lens adapting ring by pivotal rotation according to another preferred embodiment of the present invention.

In an embodiment of the present invention, the third fixing base 111 on the second body 110 is configured to rotate relative to the first sliding block 103 through a pivot 116 of the pivotal connection element 115 such that a mobile phone 200 fixed to the first body 100 can be away from the lens adapting ring by pivotal rotation. After configuring the optimal distance between the external lens 210 and a mobile phone lens 220, the user turns the first body 100 and the mobile phone 200 away from the second body 110 by pivotal rotation in order to observe images from the second side 124 through the external lens 210 with the naked eye (as shown in FIG. 5). After observing the images through the external lens 210 with the naked eye, the user rotates the first body 100 and the mobile phone 200 to restore them to previous positions effectuated with the mobile lens 220 through the pivot 116. The first body 100 is movably coupled to the second body 110. In an embodiment of the present invention, not only does the pivotal connection element 115 operate in conjunction with the pivot 116, but the first body 100 and the second body 110 also each include a siding structure for sliding in a direction parallel to the first axis 106 or the second axis 107 and include a knob or any other operating element for driving the first body 100 to move along the first axis 106 or the second axis 107 so as to adjustably move the mobile phone lens 220 toward or away from the external lens 210.

Figure 11:
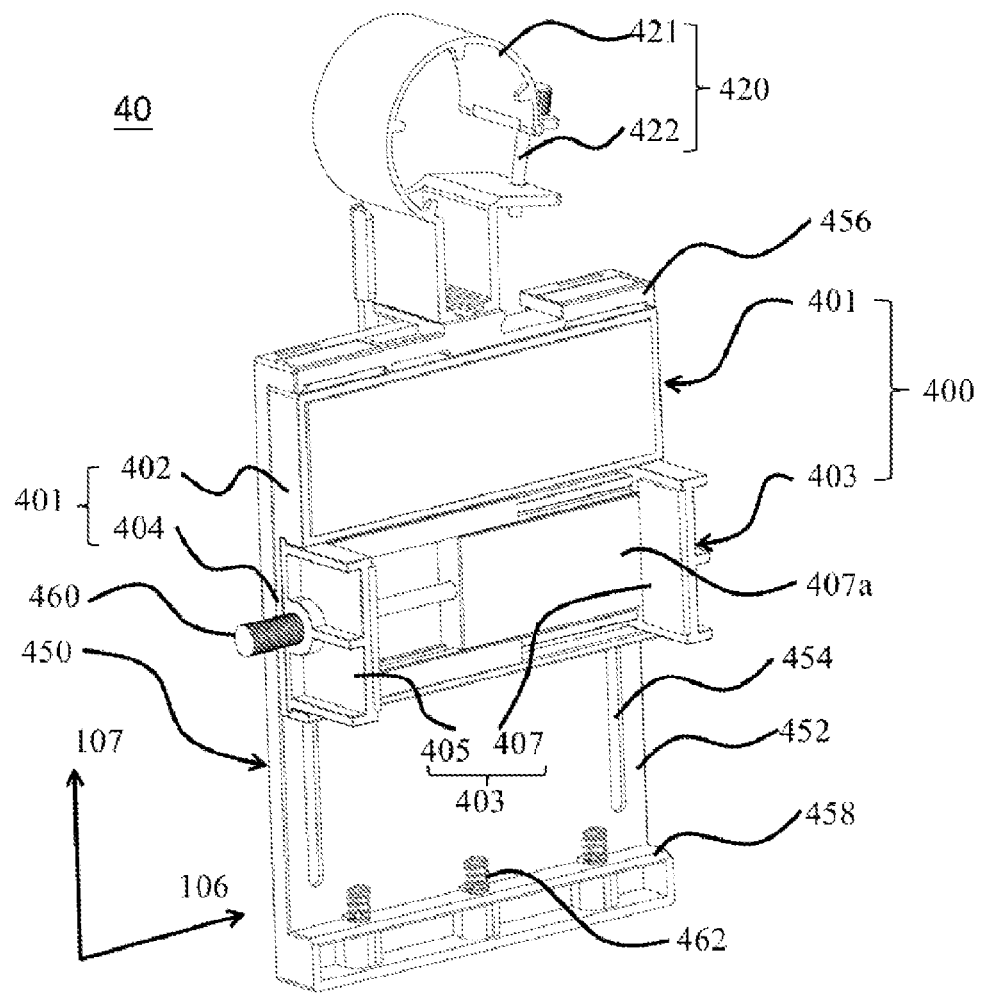
FIG. 11 illustrate another embodiment of a mobile phone adapting device of the present invention.
Figure 12:
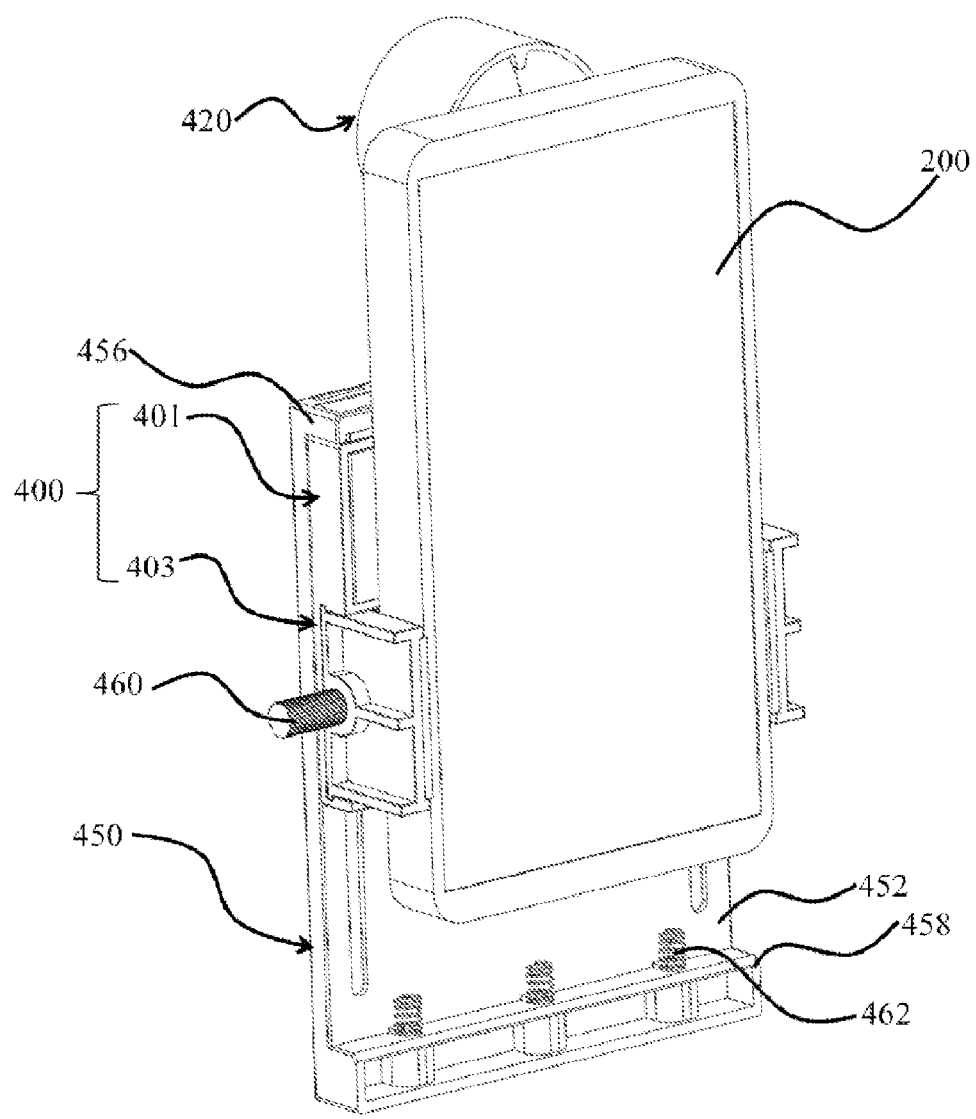
FIG. 12 illustrate another embodiment of a mobile phone adapting device of the present invention.

Please refer to FIGS. 11 and 12, another embodiment of a mobile phone adapting device of the present invention is illustrated. The mobile phone adapting device 40 of the embodiment includes: a first body 400 configured to clamp a mobile phone 200 along a direction parallel to a first axis 106; a second body 450 slidably coupled to the first body 400 along to a direction parallel to a second axis 107; and a lens adapting ring 420 disposed on an upper side of the second body 450. The first body 400 can adjust a lens of the mobile phone 200 aligning the lens adapting ring 420 fixed to an external lens (not shown) of an optical device such as a microscope or a telescope, therefore the mobile phone can capture the image observed by the optical device. Similar to aforesaid embodiments, the lens adapting ring 420 can include a C-shape structure 421 and a clamping member 422, and the position of the adapting ring 420 can be adjusted by a mechanism including a sliding block and a rail.

The first body can include a first base 401, and the second body 450 can include a second base 452. The second base 452 can include at least a groove 454, and the first base can include a sliding block (not shown) corresponding to the groove for embedded into the groove. In another embodiment, other slidably-coupling mechanism can be formed between the first base 401 and the second base 402, and the sliding direction of those slidably-coupling mechanism can be parallel to the direction of the second axis 107.

The first base 401 can include a first abutting part 402 such as a platform and a slidably-coupling part 404 such as a platform having a groove. The first body 400 can further include a fixing mechanism 403 including a first fixing base 405 and a second fixing base 407. Each of The first fixing base 405 and the second fixing base 407 has a protruding strip slidably-coupled to the slidably-coupling part 404 along the direction parallel to the first axis 106, and the first fixing base 405 is also slidably-coupled to the second fixing base 407 along the direction parallel to the first axis 106. Each first fixing base 405 and the second fixing base 407 can include a plat opposite each other, and a fixing member 460 penetrating through the two fixing bases to adjust the distance between the two fixing bases, therefore the mobile phone can be firmly clamped between the two fixing bases. The fixing member 460 can be a rod including a male screw and an operation part on the two ends thereof, respectively. The operation part can locate on a side of the first fixing base 405, and the second fixing part 407 includes a screwing hole corresponding to the male screw therein, therefore a distance between the two fixing bases can be adjusted by turning the operation part. The slidably-coupling mechanism between the first fixing part 405 and the second fixing part 407 can be similar to aforesaid embodiments, for example an incorporation of a rail and sliding block. The second fixing base 407 can include a first abutting part such as a platform coplanar to the first abutting part 402 along the direction parallel to the second axis 107, and a side surface of the mobile phone can abut against the first and second abutting parts.

The second body 452 can be a plat include a first stopping part 456 and a second stopping part 458 located at an upper end and bottom end thereof, wherein the first stopping part and the lens adapting ring 420 are at the same end of the second base 452. The first stopping part 456 and the second stopping part 458 can be plats, respectively, to restrict the movement of the first body 400 along the direction parallel to the second axis 107. The first stopping part 456 can combine to the first body 400 to locate the lens of the mobile phone 200 at a position aligning the lens adopting ring 420. The second stopping part 458 can have multiple buffering members such as springs, when the first body 400. having the mobile phone fixed thereon detaching from the first stopping part 456, the first body 400 naturally falls resulting from gravity, and the buffer members 462 can absorb the shock resulting the first body 400 falls, and the user does not need to hold the first body 400 or the mobile phone all the time.

Figure 13:
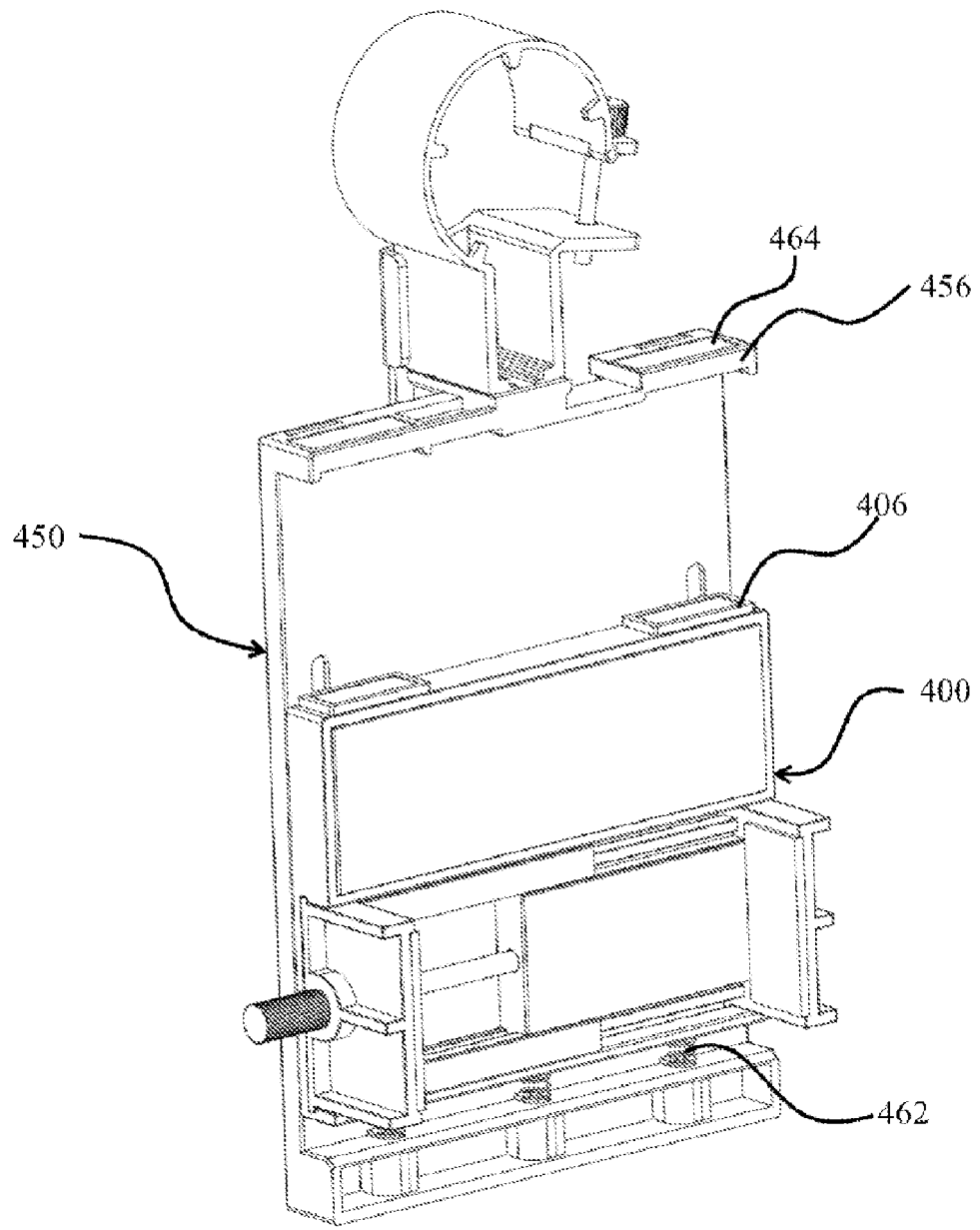
FIG. 13 illustrate another embodiment of a mobile phone adapting device of the present invention.
Figure 14:
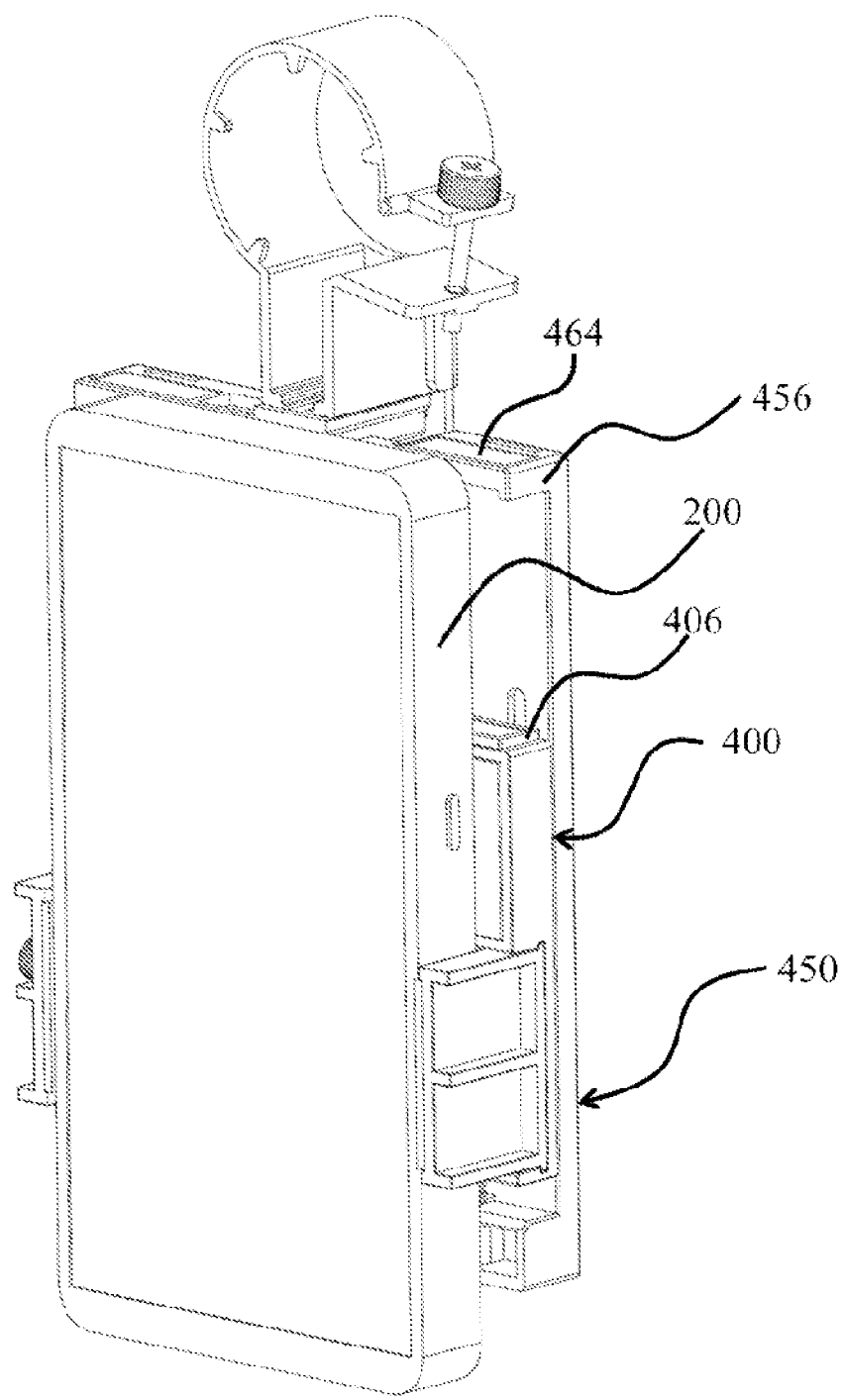
FIG. 14 illustrate another embodiment of a mobile phone adapting device of the present invention.

Please refer to FIGS. 13 and 14 the first body 400 detaching from the first stopping part 456 of the mobile phone adapting device 40 of the embodiment is illustrated. The first body 400 can include a first engaging part 406 on the top side thereof, and the first stopping part 456 can include a second engaging part 464 corresponding to the first engaging part 406, and in an embodiment the first engaging part 406 can be a protruding block, and the second engaging part 464 can be a hole.

A user can press the first engaging part 406 engaged in the second engaged part 464 to detach the first engaging part 406 from the second engaging part 464, therefore the first body 400 having the mobile phone 200 fixed thereon falls, and the buffer members 462 can absorb the shock that the first body 400 strikes the second stopping part 458 to prevent damaging the mobile phone 200.

In an embodiment of the invention, the first axis 106 is perpendicular to the second axis 107.

Due to the aforesaid movable coupling structures, switching between the observation effectuated with the naked eye and the observation effectuated with the mobile phone lens 220 requires the user to move the first body 100 and the second body 110 relative to each other rather than mount and dismount the mobile phone 200 on and from the mobile phone adapting device 10 repeatedly. Hence, the mobile phone adapting device 10 of the present invention is a semi-fixed device.

Figure 6:
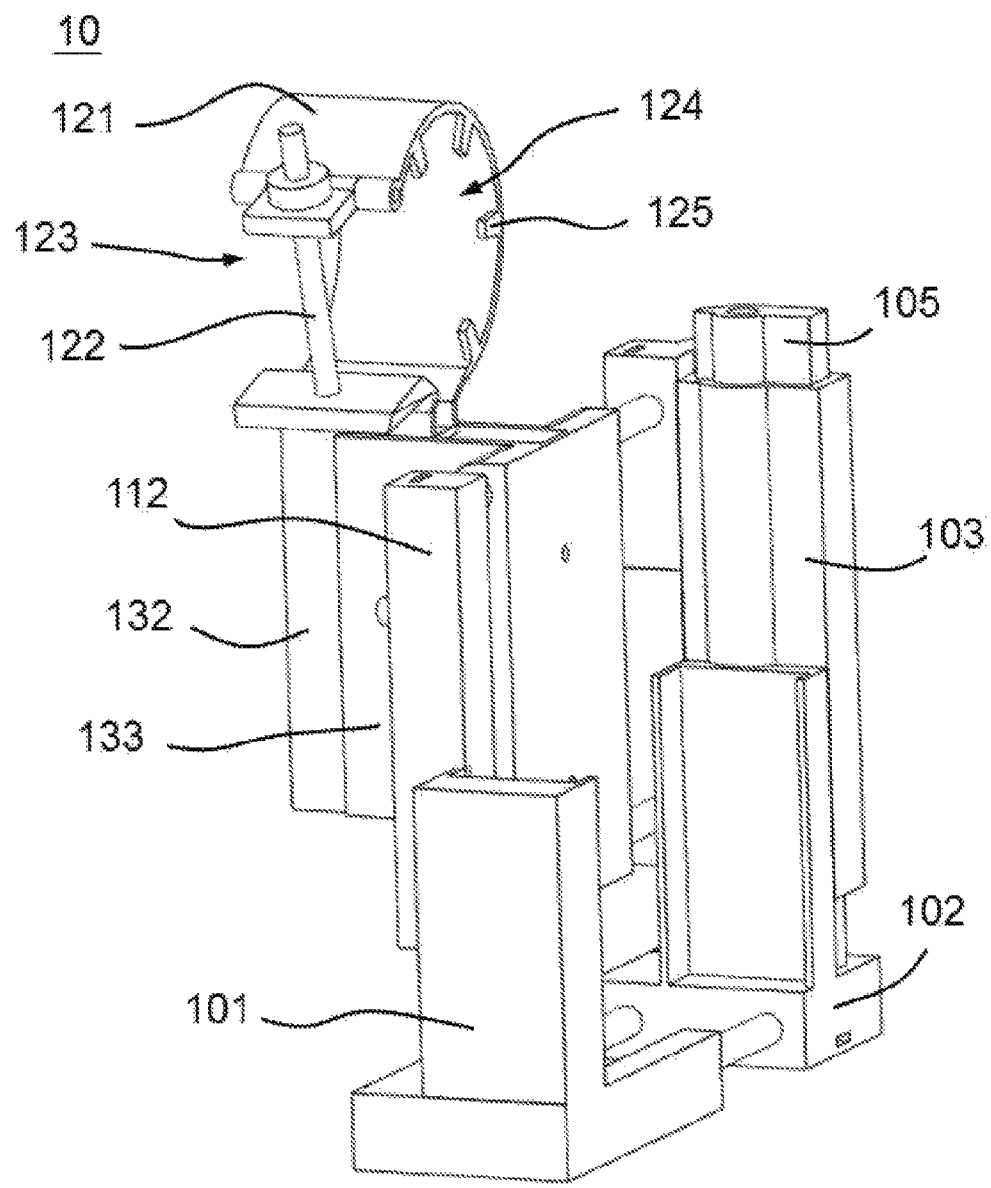
FIG. 6 is a perspective schematic view of a vane structure according to another specific embodiment of the present invention.
Figure 7:
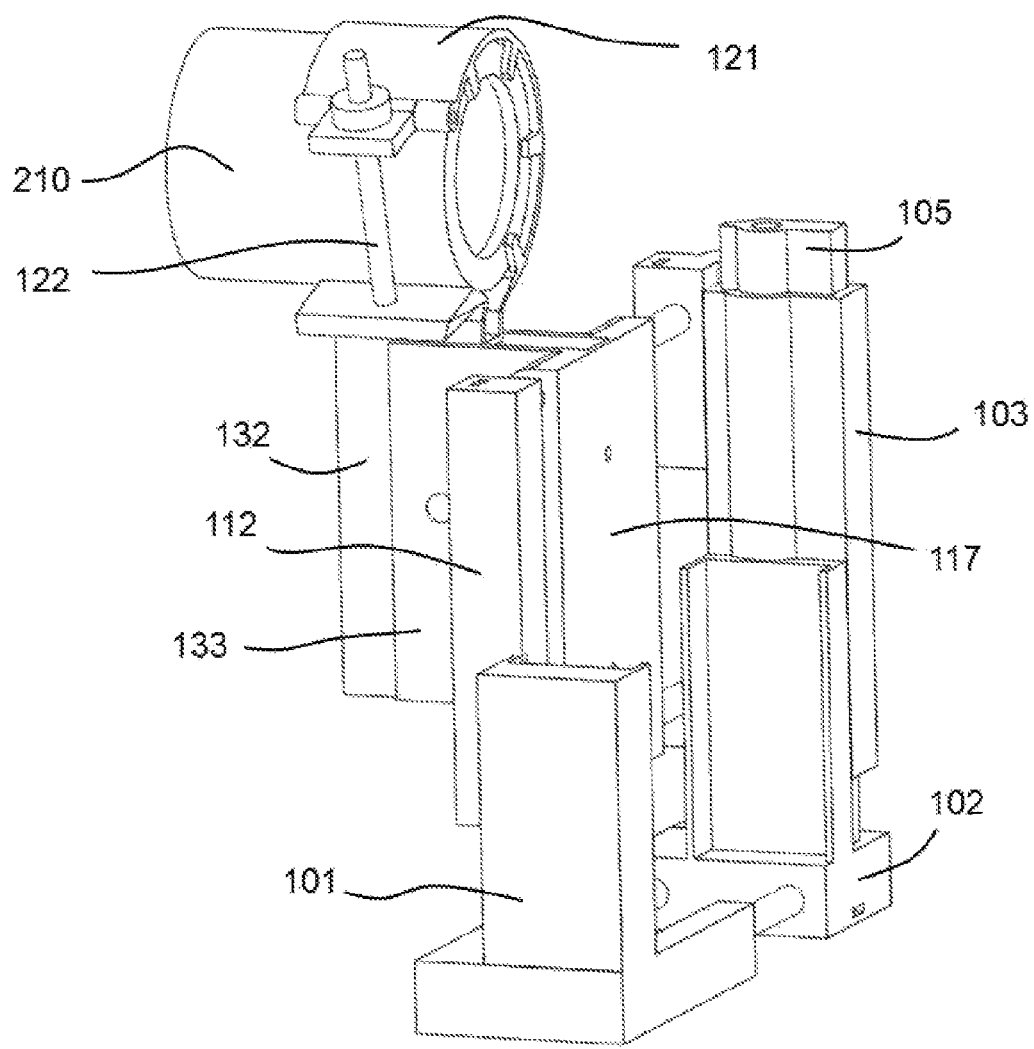
FIG. 7 is a perspective schematic view of an external lens in contact with the vane structure according to yet another specific embodiment of the present invention.
Figure 8A:
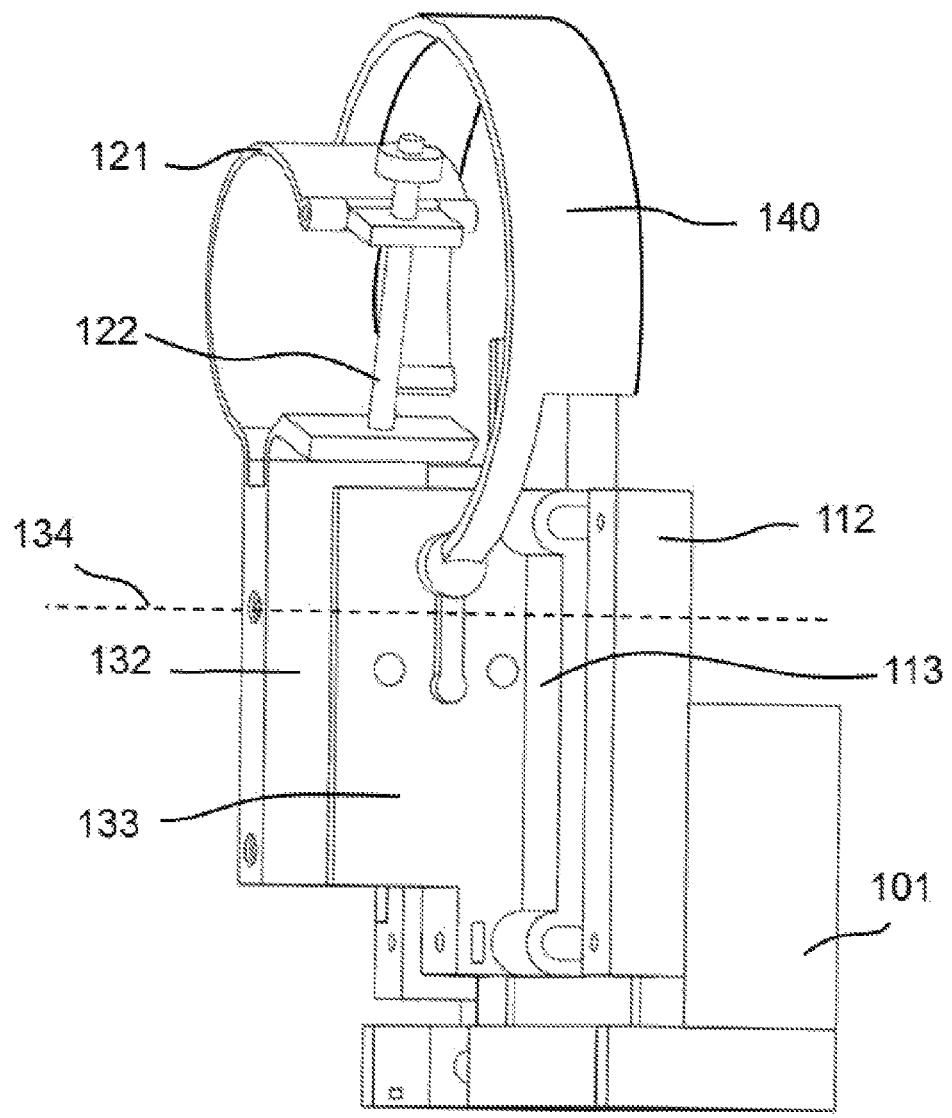
FIG. 8A is a perspective schematic view of the lens adapting ring moving along the direction parallel to the third axis according to another embodiment of the present invention.
Figure 8B:
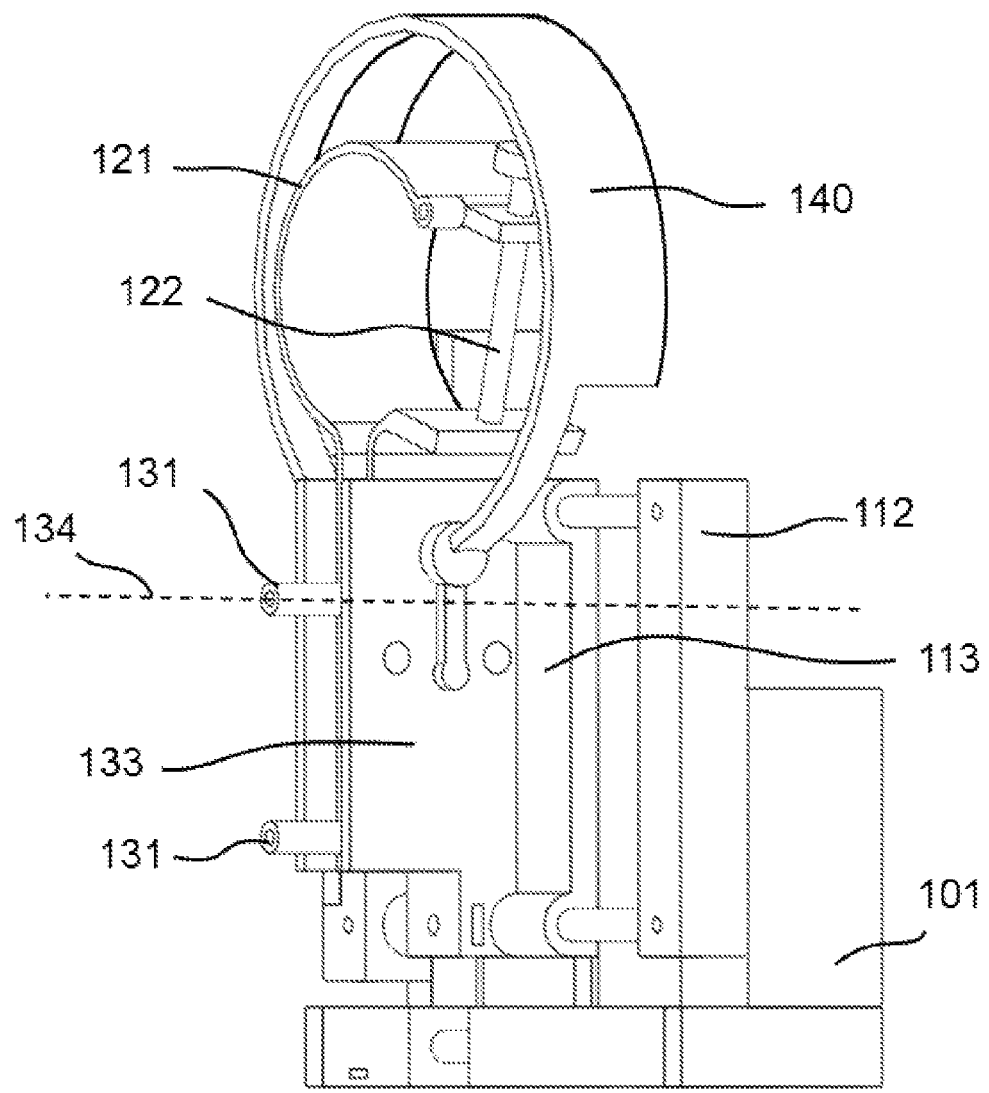
FIG. 8B is another perspective schematic view of the lens adapting ring shown in FIG. 8A and moving along the direction parallel to the third axis.

Moreover, the lens adapting ring 120 includes a vane structure 125 surrounding the second side 124 of the lens adapting ring 120 (as shown in FIG. 6). The vane structure 125 can be panel-like, wedge-like, triangular, twisted curved or teeth-like. The vane structure 125 disposed on the second side 124 is capable of fixing the external lens 210 in place. The external lens 210 can be fixed in place within the C-shaped structure 121 through the clamping member 122 while the external lens 210 enters the lens adapting ring 120 from the first side 123 and contacts the vane structure 125 of the second side 124 (see FIG. 7). At this point in time, the user can adjust the optimal distance between the external lens 210 and the mobile phone lens 220 along a direction parallel to the third axis 134 (as shown in FIG. 8A and FIG. 8B) such that optical images in the external lens 210 are clearly displayed on the display screen of the mobile phone 200. After removing the external lens 210 from the mobile phone adapting device 10, the user may access the external lens 210 again by merely inserting the external lens 210 into the lens adapting ring 120 to contact the vane structure 125 and then adjusting the external lens 210 to the optimal position on the fourth rail 131 in accordance with previous setting so as to perform a focusing process quickly. In another embodiment of the present invention, the fourth rail 131 includes dimensions-related marks for use in a positioning process.

In a preferred embodiment of the present invention, the first axis 106 is perpendicular to the second axis 107. In another preferred embodiment of the present invention, the third axis 134 is perpendicular to the first axis 106 and the second axis 107. Hence, the design of the first axis 106, the second axis 107, and the third axis 134 together enable the mobile phone adapting device 10 to be connected to mobile phones with different dimensions, brand names or model numbers, enable the optical axis of the external lens 210 to coincide with the optical axis of the mobile phone lens 220, and enable the optimal distance between the external lens 210 and the mobile phone lens 220 to be adjusted, such that the sharp images of appropriate size can be captured with the mobile phone lens 220, so as to avoid the drawbacks, such as (1) that the images of the external lens 210 are not focused on a camera sensing component of the mobile phone 200; (2) that the images of the external lens 210, which are focused on the sensing component of the mobile phone 200, are too small so as not to fully use all the pixels of the sensing component; and (3) that the images of the external lens 210, which are focused on the sensing component of the mobile phone 200, are too large that the visual fields observed with the optical device are diminished.

Figure 9:
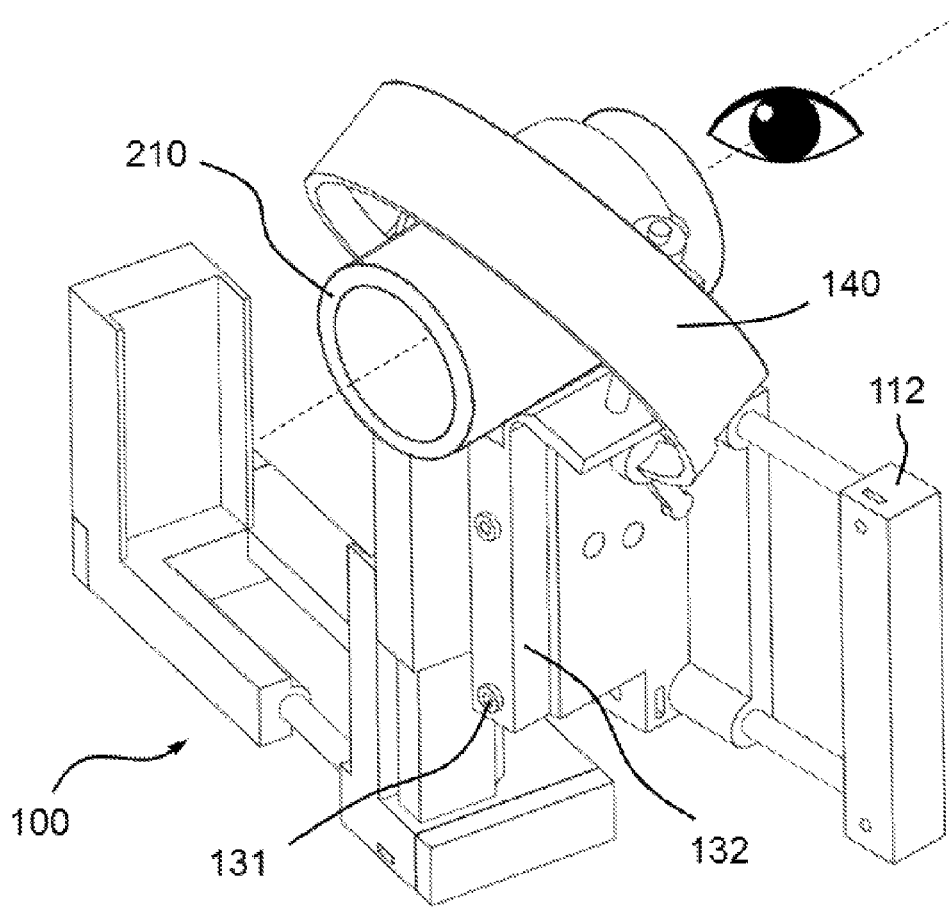
FIG. 9 is a perspective schematic view of a hood according to a preferred embodiment of the present invention.

Referring to FIG. 1A and FIG. 1B, the mobile phone adapting device 10 of the present invention further includes a hood 140 connected to the connecting member 130. The hood 140 is for shielding leaking light that may occur when the lens adapting ring 120 being connected to the external lens 210 and the mobile phone lens 220, so as to prevent ambient leaking light from interfering with the optical images which are received by the mobile phone lens 220 from the external lens 210. In a specific embodiment of the present invention, the inner diameter of the hood 140 is larger than the maximum outer diameter of the lens adapting ring 120 such that the lens adapting ring 120 is configured to move in a direction parallel to the third axis 134 in order to enter the hood 140. In a preferred embodiment of the present invention, the hood 140 is pivotally connected to the connecting member 130 (as shown in FIG. 9). To fix the external lens 210 to the lens adapting ring 120 with the clamping member 122 or observe images through the external lens 210 with the naked eye, the user can turn the hood 140 away from the clamping member 122 by rotating the hood 140 pivotally. After finishing the clamping process or performing observation with the naked eye, the user may move the hood 140 to restore to the initial position by pivotal rotation. Both the hood 140 and the lens adapting ring 120 are painted in matte black to prevent reflected light from interfering with optical images received by the mobile phone lens 220 and the external lens 210.

Figure 10:
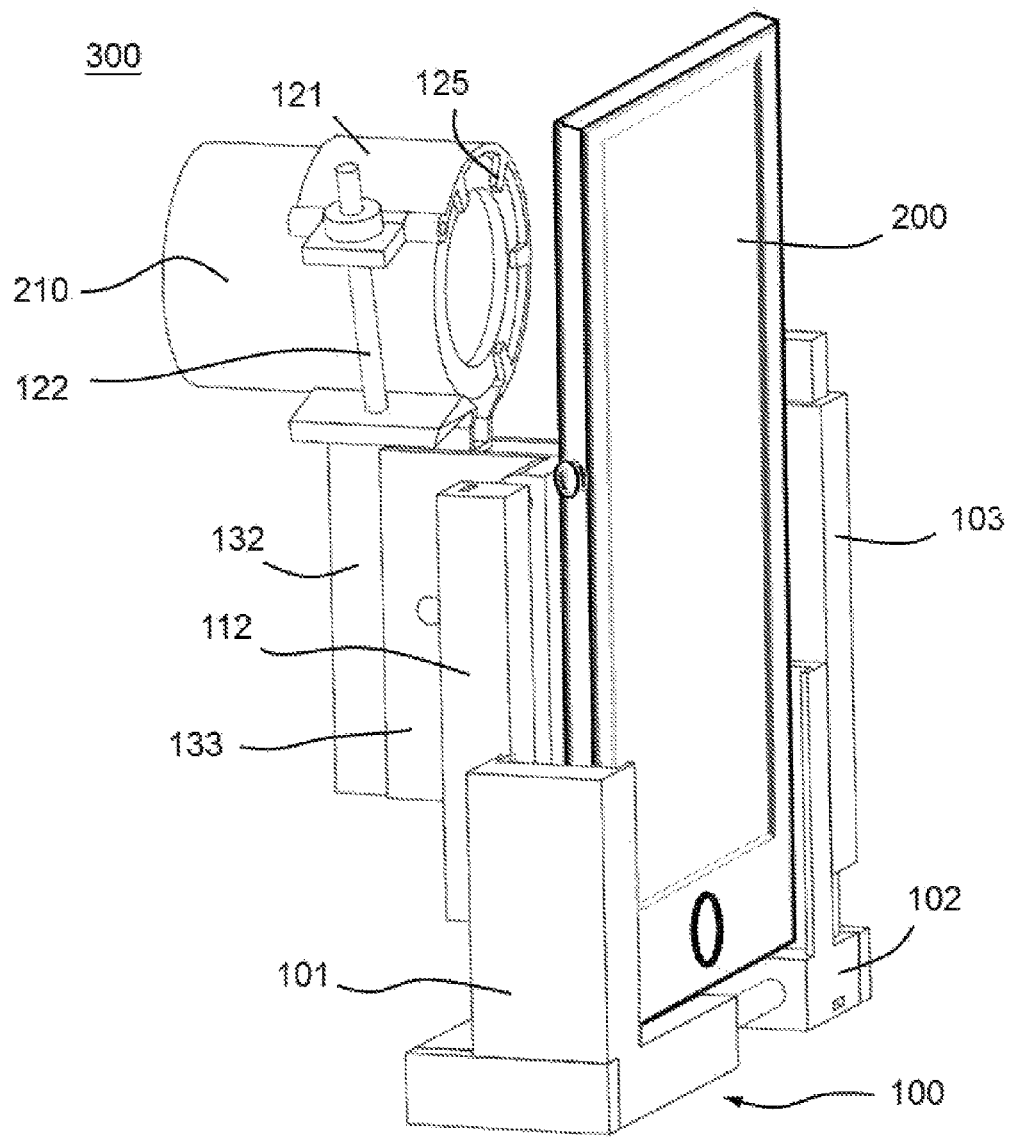
FIG. 10 is a perspective schematic view of a mobile phone adapting system according to a specific embodiment of the present invention.

Referring to FIG. 5 and FIG. 10, the present invention further provides a mobile phone adapting system 300 which includes the mobile phone adapting device 10 (as shown in FIGS. 1A, 1B), the mobile phone 200, and the external lens 210. The mobile phone 200 is fixed to the first body 100 by the first fixing base 101 and the second fixing base 102. The side of the mobile phone 200, which the mobile phone lens 220 is disposed on, defines a first plane 117 which faces the plate 113. The external lens 210 enters the lens adapting ring 120 from the first side 123 and contacts the vane structure 125. The clamping member 122 clamps the C-shaped structure 121 to allow the lens adapting ring 120 to clamp the external lens 210. The first sliding block 103 and the plate 113 are moved adjustably along the direction parallel to the first axis 106 or the second axis 107 such that the optical axis of the external lens 210 coincides with the optical axis of the mobile phone. The second sliding block 132 is moved along the third axis 134. Hence, the optical images of the external lens 210 are clearly displayed on the screen of the mobile phone 200.

In conclusion, the present invention provides a mobile phone adapting device and system which are characterized in that: (1) to mount a mobile phone on the first body merely requires operating a clamping structure formed between the first and second fixing bases; (2) the lens adapting ring fixes one end of the external lens tightly to the lens adapting ring from inside; (3) moving the first sliding block and the plate such that the optical axis of the external lens can coincide with the optical axis of the mobile phone lens; (4) the lens adapting ring which clamps the external lens is moved by the connecting member along a direction parallel to the optical axis of the mobile phone lens to adjustably configure the optimal distance between the external lens and the mobile phone lens; (5) the mobile phone adapting device includes a hood disposed between the lens adapting ring and the mobile phone to prevent ambient leak light from interfering with the optical images inside the lens adapting ring; and (6) the second body rotatable about a pivot enables a user to switch easily between observing images through the external lens with the naked eye and observing images through the external lens with the mobile phone lens. From practical application of the aforesaid embodiments. It can be figured out that the mobile phone adapting device of the present invention is effective in connecting an external lens with non-specific dimensions to a mobile phone with a non-specific brand name and ensures that optical images in the external lens (a microscope, a telescope or any optical device equipped with a eyepiece) can be clearly displayed on the mobile phone screen. Such convenient and economic mobile phone adapting device exactly resolves the issue that connects smartphones with different brand names and model numbers to lenses of different types.

Although the present invention is disclosed above by preferred embodiments, the embodiments are not restrictive of the present invention. Any persons skilled in the art can make some changes and modifications to the embodiments without departing from the spirit and scope of the present invention. Accordingly, the legal protection for the present invention should be defined by the appended claims.

What is claimed is:

1. A mobile phone adapting device, comprising:
a first body, comprising a first rail, a first fixing base disposed at a first end of the first rail, a second fixing base disposed at a second end of the first rail, a second rail extending from the second end to a third end, and a first sliding block movable along the second rail and between the second end and the third end, wherein the first rail connects the first fixing base and the second fixing base, respectively, the first fixing base is coupled to the first rail and movable along a first axis, the second rail connects the second fixing base and the first sliding block, and the first sliding block is coupled to the second rail and movable along a second axis;
a second body, disposed on an extended plane parallel to the first body, fixed to the first body, and comprising a third rail, a third fixing base disposed on the extended plane and at a third end of the third rail, a fourth fixing base disposed at a fourth end of the third rail, and a plate disposed on the extended plane, wherein two ends of the third rail are connected to the third fixing base and the fourth fixing base, respectively, and the plate is coupled to the third rail and moving in a direction parallel to the first axis;
a lens adapting ring, disposed at an upper end of the plate, fixed to the plate, and comprising a C-shaped structure and a clamping member disposed at a terminal end of the C-shaped structure, wherein the C-shaped structure has a first side and a second side; and
a connecting member, disposed on the plate and including a fourth rail extending in a direction perpendicular to the plate, a second sliding block surrounding the fourth rail, and a block casing surrounding the fourth rail, wherein the second sliding block is coupled to the fourth rail and moves along a direction parallel to the third axis, and the lens adapting ring is connected to the second sliding block.

2. The mobile phone adapting device of claim 1, further comprising a hood pivotally connected to the block casing.

3. The mobile phone adapting device of claim 1, wherein the clamping member comprises a nut and a screw meshing with the nut.

4. The mobile phone adapting device of claim 1, wherein the lens adapting ring has a vane structure surrounding the second side.

5. The mobile phone adapting device of claim 1, further comprising a pivotal connection element disposed at the third end, wherein the third fixing base is pivotally connected to the first sliding block through the pivotal connection element and adapted to rotate relative to the first sliding block through a pivot of the pivotal connection element.

6. The mobile phone adapting device of claim 1, wherein the first rail contains a spring with two ends connected to the first fixing base and the second fixing base, respectively.

7. The mobile phone adapting device of claim 1, wherein the first axis is perpendicular to the second axis.

8. The mobile phone adapting device of claim 7, wherein the third axis is perpendicular to the first axis and the second axis.

9. The mobile phone adapting device of claim 1, further comprising a clamping structure formed between the first fixing base and the second fixing base to allow a mobile phone to be clamped between the first fixing base and the second fixing base.

10. A mobile phone adapting system, comprising:
a mobile phone adapting device of claim 1;
an external lens fixed to the C-shaped structure; and
a mobile phone having a mobile phone lens and a mobile phone screen,
wherein the external lens can enter the lens adapting ring from the first side, and the clamping member can clamp the C-shaped structure to allow the lens adapting ring to clamp the external lens, wherein the first fixing base and the second fixing base fix the mobile phone to the first body, wherein the plate is moved to allow an optical axis of the external lens and an optical axis of the mobile phone lens to coincide, wherein the second sliding block is movable to display optical images of the external lens clearly on the mobile phone screen.

11. The mobile phone adapting system of claim 10, wherein the clamping member comprises a nut and a screw meshing with the nut.

12. The mobile phone adapting system of claim 10, wherein the lens adapting ring has a vane structure surrounding the second side.

13. The mobile phone adapting system of claim 10, wherein the mobile phone adapting device further comprises a clamping structure formed between the first fixing base and the second fixing base to allow a mobile phone to be clamped between the first fixing base and the second fixing base.

14. A mobile phone adapting device including:
- a first body, comprising a first base including a first abutting part and a slidably-coupling part, a fixing mechanism including a first fixing base and a second fixing base, wherein each of the first fixing base and the second fixing base has a protruding strip slidably-coupled to the slidably-coupling part along a direction parallel to a first axis, and the first fixing base is also slidably-coupled to the second fixing base along the direction parallel to the first axis;
- a second body, located on an extended plane parallel to the first body, including a second base located on the extended plane including at least a groove, wherein the first base of the first body includes a sliding block corresponding to the groove for embedding into the groove, and the sliding block slides along a direction parallel to a second axis;
- a lens adapting ring, disposed on an upper side of the second base of the second body, including a C-shaped structure and a clamping member disposed at a terminal end of the C-shaped structure, wherein the C-shaped structure has a first side and a second side; and
- a connecting member, disposed on the plate and including a fourth rail extending in a direction perpendicular to the plate, a second sliding block surrounding the fourth rail, and a sliding-block casing surrounding the fourth rail, with the second sliding block coupled to the fourth rail and moving along a third axis, wherein the lens adapting ring is connected to the second sliding block.

15. The mobile phone adapting device of claim 14, further comprising a hood pivotally connected to the block casing.

16. The mobile phone adapting device of claim 14, wherein the clamping member comprises a nut and a screw meshing with the nut.

17. The mobile phone adapting device of claim 14, wherein the lens adapting ring has a vane structure surrounding the second side.

18. The mobile phone adapting device of claim 14, wherein the first axis is perpendicular to the second axis.

19. The mobile phone adapting device of claim 14, wherein the third axis is perpendicular to the first axis and the second axis.

20. A mobile phone adapting system, comprising:
- a mobile phone adapting device of claim 14;
- an external lens fixed to the C-shaped structure; and
- a mobile phone having a mobile phone lens and a mobile phone screen,
- wherein the external lens can enter the lens adapting ring from the first side, and the clamping member cam clamp the C-shaped structure to allow the lens adapting ring to clamp the external lens, wherein the first fixing base and the second fixing base fix the mobile phone to the first body, wherein the second base is moved to allow an optical axis of the external lens and an optical axis of the mobile phone lens to coincide, wherein the second sliding block is movable to display optical images of the external lens clearly on the mobile phone screen.

* * * * *